United States Patent [19]

McRobert

[11] 4,257,218
[45] Mar. 24, 1981

[54] HARVESTER FOR VEGETABLE CROPS SUCH AS TOMATOES OR THE LIKE

[75] Inventor: Leon R. McRobert, Ocoee, Fla.

[73] Assignee: FMC Corporation, San Jose, Calif.

[21] Appl. No.: 101,606

[22] Filed: Dec. 10, 1979

[51] Int. Cl.³ .............................................. A01D 45/00
[52] U.S. Cl. .................................. 56/327 R; 56/14.5; 171/26
[58] Field of Search ................. 56/327 R, 14.5, 14.6, 56/17.2, 327 A; 171/83, 26, 27, 28

[56] References Cited

U.S. PATENT DOCUMENTS

| | | | |
|---|---|---|---|
| 2,636,333 | 4/1953 | Machaels | 56/255 |
| 2,724,228 | 11/1955 | Duncan | 56/17 |
| 2,770,085 | 11/1956 | Laughlin | 56/25.4 |
| 2,801,513 | 8/1957 | Olson | 172/44 |
| 3,330,363 | 7/1967 | Greedy | 171/1 |
| 3,390,768 | 7/1968 | Button | 209/84 |
| 3,399,520 | 9/1968 | Porter | 56/327 R |
| 3,436,902 | 4/1969 | Gates et al. | 56/327 R |
| 3,473,613 | 10/1969 | Boyce | 56/327 R |
| 3,581,483 | 6/1971 | Kohl | 56/327 A |
| 3,690,383 | 9/1972 | Malley et al. | 171/126 |
| 3,756,322 | 9/1973 | Kopasz | 56/327 R |
| 3,921,723 | 11/1975 | Seem | 56/327 R |
| 4,157,005 | 6/1979 | Orlando et al. | 56/327 R |

Primary Examiner—Paul J. Hirsch
Attorney, Agent, or Firm—R. S. Kelly

[57] ABSTRACT

An improved direct-loading crop harvester is disclosed as having a single rotating disc which supports the front end of a pickup conveyor which is pivotally attached to the main frame of the harvester. The disc is provided with a plurality of broad teeth along its periphery and is caused to rotate in a manner which severs the crops at a point near ground level as the harvester proceeds in a forward direction. In this manner, the single cutting disc provides the sole means of support for the front end of the pickup conveyor, and the cross-sectional shape of the cutting disc determines the height above the ground at which the vines are severed. This invention is particularly useful in harvesting crops from planting ridges which are covered with plastic.

15 Claims, 8 Drawing Figures

FIG_1
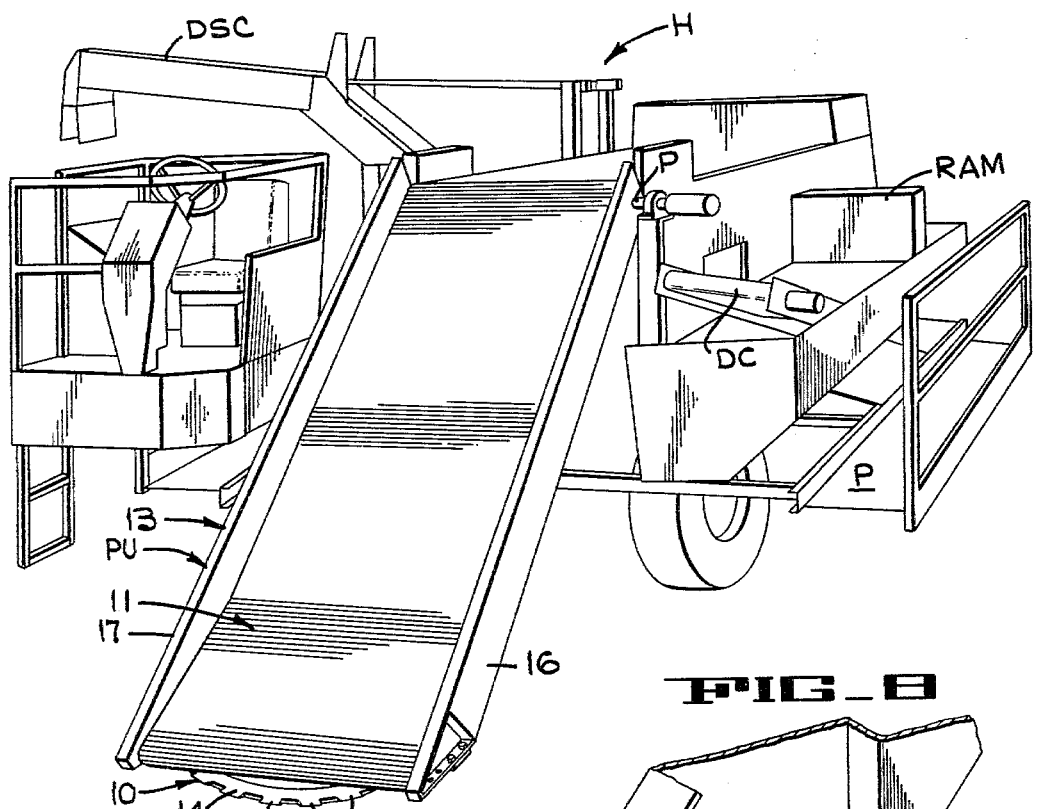
FIG_8
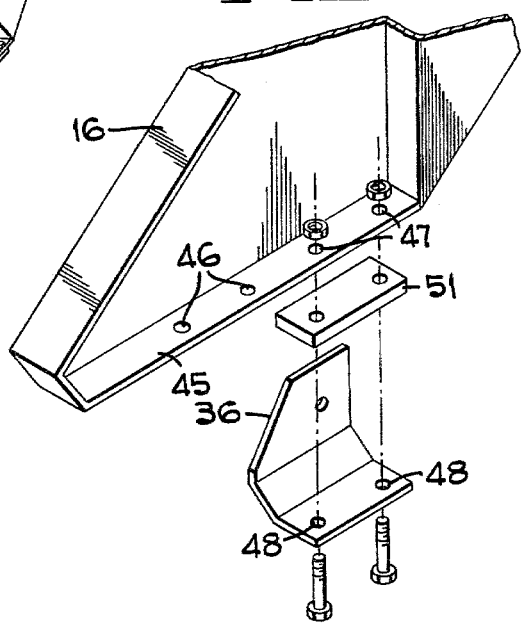
FIG_5

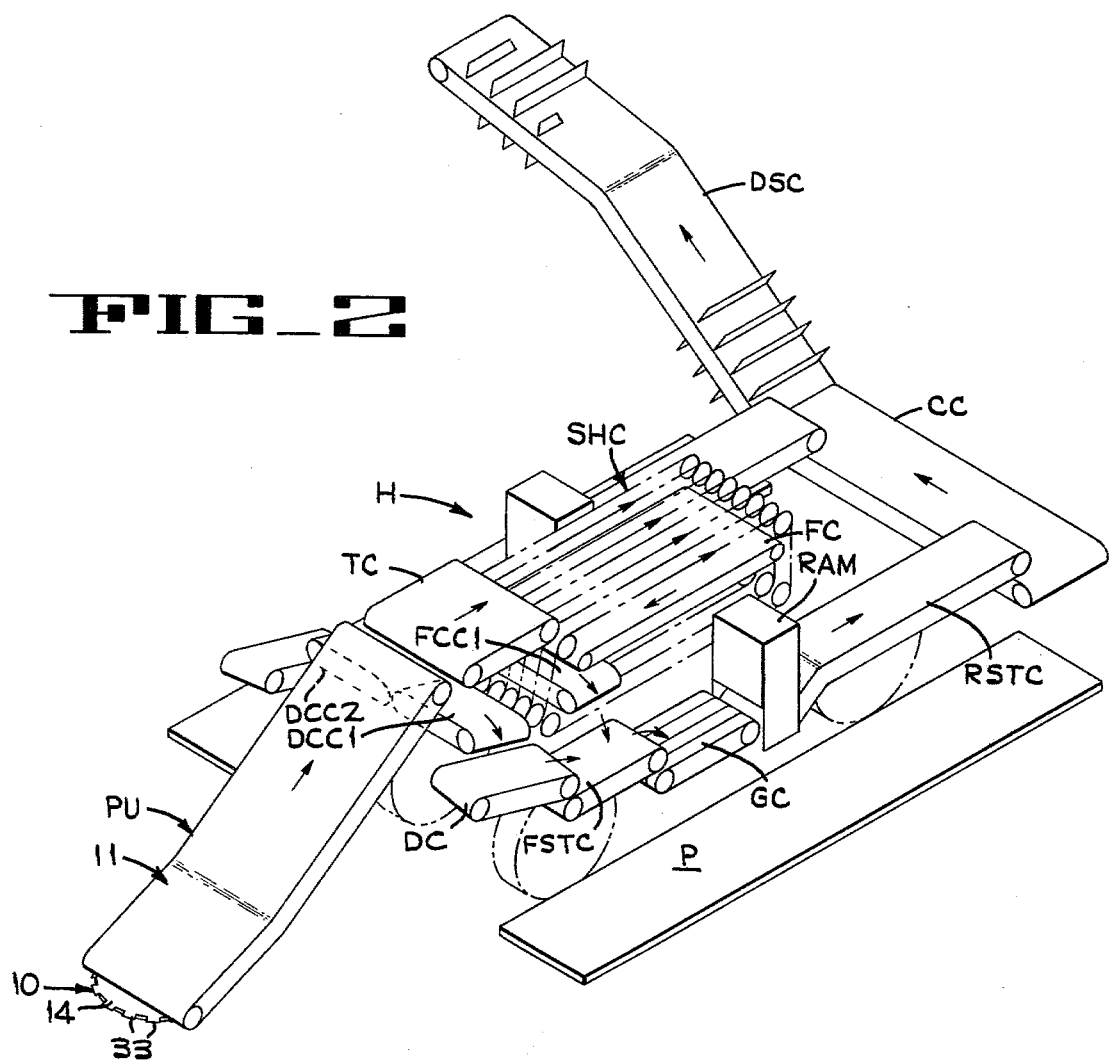
FIG_2
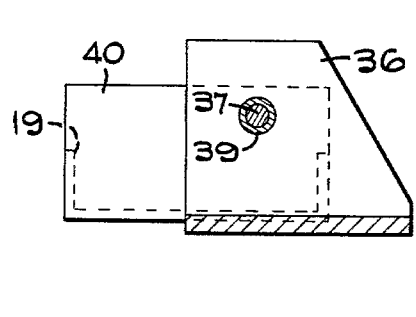
FIG_7
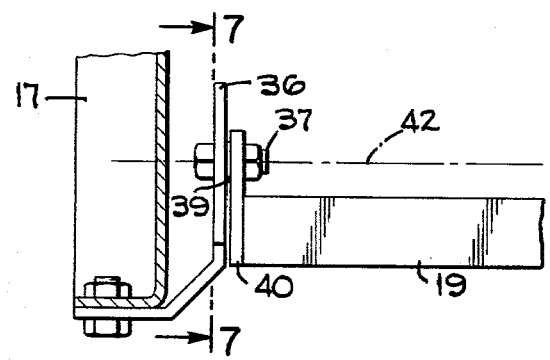
FIG_6

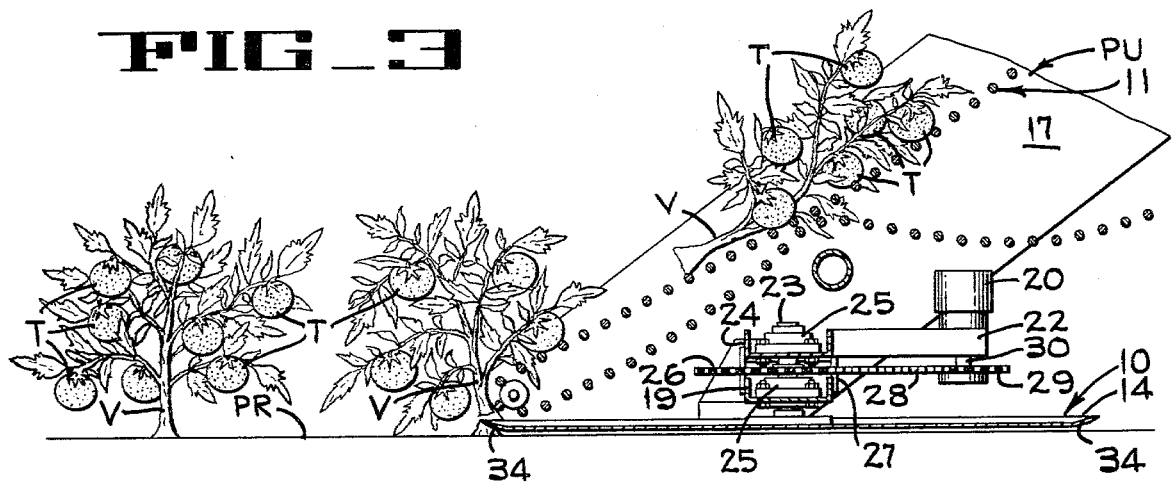
FIG_3
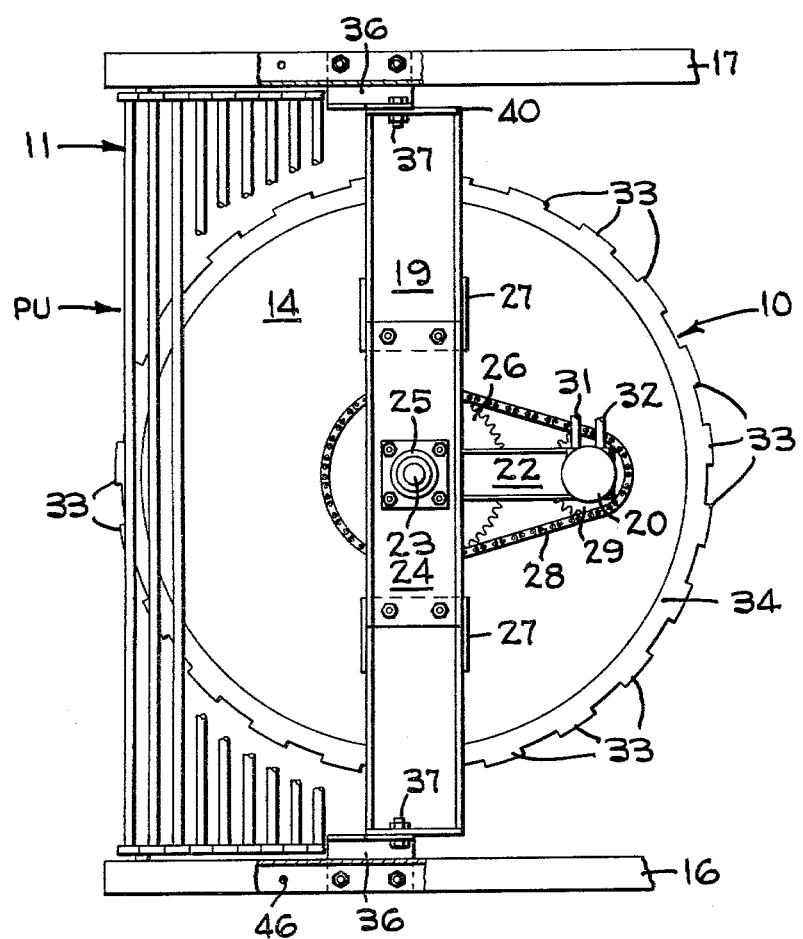
FIG_4

HARVESTER FOR VEGETABLE CROPS SUCH AS TOMATOES OR THE LIKE

BACKGROUND OF THE INVENTION

1. Field of the Invention

This invention generally relates to apparatus for harvesting above ground vegetable crops, such as tomatoes. More particularly, the present invention concerns direct-loading harvesters of the type which include a mechanism at the front end for removing the plants from the ground and a conveyor for lifting the plants from the ground to shaking apparatus or the like where the crops can be separated from the plants.

2. Description of the Prior Art

Direct-loading harvesters have been known in the art for many years and have recently enjoyed widespread use in the harvesting of tomatoes. Such harvesters are arranged to harvest tomato plants grown in rows, to elevate the harvested plants to shaker conveyors for separating tomatoes from their vines, to carry the tomatoes from the shaker conveyors to sorter conveyors where undesired tomatoes and trash are removed, and finally to elevate the remaining tomatoes from the harvester to an attendant truck or trailer for delivery to market.

Conventional tomato harvesters combine a means for severing the tomato plant from the earth with a pickup conveyor that transports the tomato plant to the central part of the harvester where the tomatoes are separated and sorted as described above. A number of different methods are employed to sever the tomato vine at or below ground level including counter-rotating discs (see e.g., Greedy, U.S. Pat. No. 3,330,363; Boyce, U.S. Pat. No. 3,473,613; Seem, U.S. Pat. No. 3,921,723); sickle bars spaced ahead of the pickup conveyor (see, e.g., Button, U.S. Pat. No. 3,390,768); and rotating cutting bars (see, e.g., Malley, U.S. Pat. No. 3,690,383; Roberts, U.S. Pat. No. 2,954,085).

Typically, the cutting means is mounted on the forward portion of the pickup conveyor. A header frame, housing the pickup conveyor, is pivotally mounted on the main frame of the harvester allowing the header frame to float with the contours of the soil. Support means are provided to fix the position of the cutting means and header frame in relation to the ground as the harvester moves over a varying ground profile. Most often, wheels are placed on the front end of the header frame allowing the cutting means to approximately follow the contours of the soil. Alternatively, some harvesters attach the front end of the pickup conveyor to the main frame. This latter method does not allow the header frame to compensate for varying contours at all. The present invention is an improved means for supporting the header frame using a single cutting disc which is designed to closely follow the profile of the soil.

An additional objective in the design of tomato harvesters is to gather a high percentage of the crop. Many tomatoes lie on or near the ground at the time the vine is ready to be harvested. In order to miss as few tomatoes as possible, several harvesters sever the tomato vine below the surface of the dirt and the resulting layer of earth, along with all vines and tomatoes lying thereon, is directed up the pickup conveyor. The success of this approach is limited by irregularities in the contour of the ground and carries the disadvantage that large amounts of earth must later be separated from the tomatoes. The present invention, by having its pickup means closely follow the ground surface, is able to gather virtually all tomatoes with minimum pickup of dirt.

A second design objective arises in the harvest of fresh market tomatoes, that is, tomatoes sold fresh in the market. Many fresh market tomatoes are now planted on furrows covered with plastic sheets in order to keep down weeds and to keep the tomatoes from contacting the soil and thus preserve their appearance. It is obvious that a harvester designed to sever the tomato vine below the soil would be incompatible with this type of planting. To cope with this, harvesters have been designed which attempt to accurately gauge the height of the cutting means and the pickup conveyor using complex control systems. Such systems are expensive, necessarily involving electrical sensing and electric-hydraulic servo controls. Even then, such feedback control necessarily involves a time delay, and the systems are not always able to adequately compensate for variations in the cutter and pickup position relative to the ground surface. No previous mechanical harvesting systems have been entirely successful in harvesting tomatoes grown on plastic covered furrows.

It is therefore an object of the present invention to provide a harvester for tomatoes or the like capable of following the contours of the soil with a maximum degree of accuracy and a minimum time delay.

It is a further object of this invention to provide a harvester capable of harvesting tomatoes or the like which lie on the ground at the time of harvesting.

It is a further object of this invention to provide a harvester capable of harvesting tomatoes or the like from furrows which are covered with plastic.

It is a further object of this invention to provide a tomato harvester which minimizes the pickup of dirt and other debris from the ground without suffering a loss in the pickup of tomatoes and tomato vines.

It is the final object of this invention to provide a means of cutting an above ground vegetable crop, such as tomatoes, at a close and controlled height above the ground which is simple, accurate and reliable.

SUMMARY OF THE INVENTION

The above objects are met by supporting the front end of the pickup conveyor of the harvester on a single rotating disc which is in contact with the ground. The disc is mounted so as to be capable of rotation about a generally vertical axis. The disc is serrated or otherwise provided with a cutting edge at its periphery, and a torque source provides the rotational motion as the harvester moves forward. The center of the disc contacts the ground, and the outer edge of the disc is preferably turned upward slightly so that the cutting edge is maintained at a predetermined height slightly above the ground level. Since the pickup conveyor frame is pivotally attached to the main frame of the harvester, the plane of the disc is free to follow the contours of the soil as the harvester proceeds down the row being harvested. The rotating disc severs the vine stems at ground level or at an elevation just above ground level as dictated by the cross-sectional shape of the disc.

DESCRIPTION OF THE DRAWINGS

FIG. 1 is a perspective of a tomato harvester in operative position illustrating the cutting disc of the present invention located at the forefront thereof.

FIG. 2 is a schematic representation of the tomato harvester illustrating the paths taken by the tomatoes, vines and debris after they are picked up from the ground.

FIG. 3 is an enlarged fragmentary section showing the front end of the tomato pickup mechanism.

FIG. 4 is a plan view of the front end of the pickup mechanism with portions being broken away to show the cutting disc.

FIG. 5 is an enlarged fragmentary detail showing the edge of the cutting disc.

FIG. 6 is an enlarged fragmentary section through one of the header frame support members particularly showing the pivotal mounting of the horizontal support beam to the header frame support member of the pickup mechanism.

FIG. 7 is a section taken along line 7—7 of FIG. 6 showing the support bracket.

FIG. 8 is an exploded view of the right front end of the header frame (as seen from FIG. 1) illustrating the adjustable attachment of the support bracket.

DESCRIPTION OF THE PREFERRED EMBODIMENT

The cutting disc and height control unit 10 (FIGS. 1, 2 and 3) of the present invention is associated with a tomato harvesting machine H which is particularly adapted to harvest fresh tomatoes T (FIG. 3) from vines V grown in a row on an elongate planting ridge PR. The machine H is designed to proceed along a row, sever the tomato vines V near ground level, elevate the vines for further processing including sorting, and transfer the vines to an awaiting truck. Although the cutting disc and height control unit 10 of the tomato harvester H will be described in the specification as handling tomatoes grown on plastic covered planting ridges, it will be understood that the machine may also handle other types of crops of similar plant structure having above-ground fruit such as cucumbers, squash, melons, peppers, and the like. It will be further understood that the machine may harvest crops grown on planting ridges which are not covered with plastic or crops grown on other than planting ridges.

Referring to FIG. 2 of the drawings, the overall operation of the tomato harvester H will be described in general terms. The tomato harvesting machine H is adapted to proceed along an elongate planting ridge PR (FIG. 3) and includes a pickup mechanism PU including a pickup conveyor 11 mounted in a header frame 13 (FIG. 1) which is pivotally attached to the main frame of the harvester H. The front end of the header frame 13 is supported solely by the cutting disc and height control unit 10, the latter including a single cutting disc 14 in direct contact with the ground. The cutting disc 14 is rotated as the harvester H proceeds forward and the toothed edge of the cutting disc severs the tomato vines just above ground level. The forward motion of the harvester H causes the vines to fall onto the pickup conveyor 11 which elevates the vines and tomatoes to a central section of the harvester where they undergo further processing.

At the top of the central section of the harvester is a longitudinal transfer conveyor TC (FIG. 2) which receives the tomatoes and vines as they are discharged from the pickup conveyor 11. There is a small gap between the discharge end of the pickup conveyor 11 and the receiving end of the transfer conveyor TC which allows loose tomatoes, and any dirt clods and other debris to drop from the vines in transit. These loose tomatoes and debris fall onto one of two short, cross conveyors DCC1, DCC2 which transfer them to either the right side or the left side of the harvester H. It should be noted that the further processing undergone on both sides of the machine is identical and such processing will be described only for the left hand side of the machine fed by cross conveyor DCC1. The tomatoes, dirt and other debris are discharged from DCC1 onto an inclined, longitudinal dirt conveyor DC which is adapted to permit loose tomatoes to roll down the conveyor while the dirt and other debris are conveyed upward and discharged from the harvester. The tomatoes fall to a front sorter conveyor FSTC positioned at the rear end of the dirt conveyor DC. Sorters, who stand on platform P, remove undesirable tomatoes and dirt that may have reached the first sort conveyor FSTC.

The transfer conveyor TC discharges vines with attached tomatoes to a shaker conveyor SHC composed of a plurality of parallel chains which oscillate and cause the tomatoes to fall from the vine. The tomatoes drop through the openings between the chains and the shaker conveyor SHC onto an undershaker fruit conveyor FC which transfers the tomatoes onto one of two cross-conveyors (only one such cross-conveyor FCC1 being visible on FIG. 2). The fruit which has fallen onto cross-conveyor FCC1 is discharged onto front sorter conveyor FSTC where it joins the fruit which fell from the inclined dirt conveyor DC. The fruit which has fallen onto the other cross-conveyor is discharged at the other side of the machine where it joins the second processing line.

The tomatoes discharged from the front sorter conveyor FSTC, having been manually and mechanically sorted to remove unsuitable tomatoes and debris, are directed to an automatic color sorter RAM where unripe (green) tomatoes may be ejected from the harvester H (e.g., where only red tomatoes are desired as where process tomatoes, as opposed to fresh tomatoes, are being harvested). In preparation for the automatic sorting, the tomatoes are discharged from the front sorter conveyor FSTC onto a grooved conveyor GC where the tomatoes fall naturally into grooves formed on the belt surface and are thus arranged into rows. The tomatoes are then fed into the automatic color sorter RAM, and only the ripe (red) tomatoes are directed onto the rear sorter conveyor RSTC. Sorters standing on platform P, generally at the rear of the harvester H, remove any remaining unsatisfactory tomatoes, dirt, and other debris. The inspected tomatoes are then discharged onto the cross feed conveyor CC where they join the inspected tomatoes from the other side of the machine H, all tomatoes being directed to the left hand side of the harvester H. From the cross-conveyor CC, the tomatoes are directed to the discharge conveyor DSC where the tomatoes are elevated and discharged into a receiving truck (not shown) which follows alongside the harvester H. For a further description of the harvester structure reference is made to U.S. Pat. No. 4,157,005 to Franklin P. Orlando et al.

The pickup mechanism PU (FIG. 1) includes the pickup conveyor 11 mounted in the header frame 13, as previously pointed out. The header frame 13 is comprised of a vertical side support member 16 and a vertical side support member 17 which are rigidly attached to one another in a parallel manner by conventional cross bars not shown in the drawings. The pickup mechanism PU is pivotally attached to the main frame of the harvester at P so that it is free to rotate about a first horizontal axis at its upper end perpendicular to the direction of travel. The elevation of the front end of the pickup mechanism PU is thus dictated by external forces (i.e., the elevation of the ground upon which it rides), and the cutting disc and height control unit 10 is able to follow contours in the soil relatively undisturbed by dirt clods and pot holes may be present. The cutting disc and height control unit 10 is also free to rotate about a second horizontal axis, located near the leading edge of the pickup mechanism PU, as described hereinafter. This second ability to compensate for irregularities in the path of travel further assures that the cutting height will be maintained within close tolerances and allows the pickup mechanism PU to travel over plastic covered planting beds without harming the plastic covering.

The cutting disc and height control unit 10 includes the cutting disc 14 as heretofore pointed out. The disc is rotatably suspended from a horizontal support channel 19 (FIGS. 4, 6 and 7), said channel being pivotally suspended between the side support member 16 and the side support member 17 (see FIG. 6) of the header frame 13. The cutting disc 14 is rotated about a generally vertical axis by a hydraulic motor 20 which is mounted on a short support channel 22 attached to and forming a T-shape with a longer support channel 24 which, in turn, is supported upon the horizontal channel 19 in spaced relationship thereabove by a pair of inverted U-shaped brackets 27 that are welded to the sides of the support channel 19 and are bolted to the floor of the overlying channel 24 (FIG. 4). A vertical drive shaft 23 (FIGS. 3 and 4) secured to and projecting from the top side of the cutting disc 14 at its center is journaled in a pair of bearing housings 25 mounted at the center of the horizontal support channel 19 and the upper support channel 24. A receiving sprocket 26 (FIG. 4) is mounted on the drive shaft 23 between the bearings 25 and is adapted to receive a drive chain 28 which is driven by a drive sprocket 29 attached to the depending drive shaft 30 (FIG. 3) of the hydraulic motor 20. Hydraulic fluid is fed to the hydraulic motor 20 from a remote hydraulic pump (not shown) through flexible connecting hoses (not shown) terminating at the hydraulic connections shown at 31 and 32 (FIG. 4). In this manner, the assembly comprising the cutting disc 14 and the associated drive mechanism and its supporting structure is free to rotate about the second horizontal axis perpendicular to the path of the harvester H (formed at the pivotal mounting of the support channel 19) while the cutting disc 14 is being driven by the hydraulic motor 20.

The construction of the cutting disc 14 is shown in FIGS. 3, 4 and 5. The diameter of the disc 14 should correspond approximately to the width of the tomato planting bed (or larger). It has been found that a 42 inch diameter cutting disc performs satisfactorily on planting beds varying in width from 38 inches to 42 inches. It is important that the weight of the pickup mechanism PU be spread over as large an area as possible so that the friction between the cutting disc and the ground, or plastic covering, be minimized. Using the 42 inch cutting disc 14 on the tomato beds described, loading of less than two pounds per square inch has been achieved. This loading is adequate for successful operation of the harvester H. The cutting blade 14 is provided with a plurality of broad cutting teeth 33 evenly spaced along its periphery. These cutting teeth 33 sheer the tomato vines V at or near their base as the cutting disc 14 rotates and the harvester H moves forward, presenting the vines to the teeth 33.

The cutting height is determined primarily by the cross-sectional profile of the cutting disc 14. It can be seen in FIG. 3 that the cutting disc 14 is essentially flat with an annular flanged portion 34 disposed upwardly around the periphery. Referring to FIG. 5, it can be seen that the height h above the ground of the leading edge of the cutting disc 14 is determined by both the length (1) of the annular flanged portion 34 along the periphery and the angle $\phi$ which the flange forms with the ground. In the present embodiment, the length (1) of the annular flange is $3\frac{1}{2}$ inches, the angle ($\phi$) is approximately 4.4 degrees and the resulting height (h) above the ground of the leading edge is one-quarter ($\frac{1}{4}$) inch. While a disc having these dimensions has been successful in field tests where the furrows were covered with plastic, modification of these dimensions might be appropriate where soil conditions differ or where the furrows are not covered with plastic.

FIGS. 6 and 7 illustrate the pivotal mounting of the horizontal support channel 19 onto the side support member 17 by means of a support bracket 36 that is bolted onto the side support member. The manner of attachment on the opposite side of the harvester (i.e., to side support member 16) is identical and will not be described. An end plate 40 is secured to the end of the support channel 19 and projects thereabove. A bolt 37 extends through a journal bearing 39 in a vertical face of the support bracket 36, pivotally attaching the vertical end plate 40 on the horizontal support channel. Since the support channel 19 is pivotally attached on the opposite side of the harvester in the same manner, the disc and height control unit 10 is free to move about the horizontal axis 42 (FIG. 6) formed between the two bearings 39. As described hereinbefore, the entire pickup mechanism PU is pivotally mounted to the main frame of the harvester H, and thus, the disc and height control unit 10 is provided with two horizontal axes about which the plane of the cutting disc 14 can compensate for variations in the contour of the soil.

The second horizontal axis 42 may be vertically and horizontally adjusted relative to the leading edge of the pickup conveyor 11, as required by different operating conditions. FIG. 8 illustrates the provisions for such vertical and horizontal adjustment on one side of the header frame 13. Provisions on the opposite side of the header frame are identical and will not be specifically described. A lower lip 45 on the side support member 16 has two pairs of holes 46, 47 drilled therethrough each corresponding to a pair of holes 48 in the horizontal face of the support bracket 36. If the user of the apparatus of the present invention desires to distribute more of the weight of the pickup unit PU on the forward half of the disc 14, the support bracket 36 is mounted in the rearward pair of holes 47. Conversely, mounting the support bracket 36 in the forward pair of holes 46 distributes more weight toward the rear half of the disc. The vertical distance between the disc 14 and the pickup conveyor 11 is adjusted by placing one or more spacer bars 51 between the side support member 16 and the horizontal face of the support bracket 36.

In operation, the tomato harvester H is driven down a row of tomato vines V (FIG. 3) planted on an elevated planting ridge PR which is covered with a plastic sheet. As described hereinbefore, the presence of the plastic sheet requires that the height of the cutting edge be closely controlled in order to sever the vine as close to the ground as possible without damaging the plastic covering. The cutting disc and height control unit 10 of the present invention is capable of meeting these twin objectives since the cutting disc 14 engages the ground directly and is adapted to follow variations in the contour of the soil.

The relative positions of the cutting disc 14, the header frame 13, and the pickup conveyor 11 and their interaction are best observed in FIGS. 1, 3 and 4. In FIG. 3, it can be seen that the single cutting disc 14 is in direct contact with the planting ridge PR and forms the sole means of support from the front end of the pickup unit PU. As the tomato harvester H moves forward, the cutting disc 14 is presented to a succession of tomato vines V which are aligned along the planting ridge PR. The leading edge of the disc 14 engages each of the tomato vines V in turn, and the rotating periphery with a plurality of broad teeth 33 severs the vines at a fixed distance above the plastic surface on the planting ridge PR. The forward motion of the harvester H causes the tomato vines V to fall onto the pickup conveyor 11 which then elevates the vines for further processing as described hereinbefore. A disc rotation of approximately seventy-five to eighty RPM has been found to be successful in thusly using the present invention.

The ability of the cutting disc 14 to closely follow the contours of the ground and to maintain a minimum height between the pickup conveyor 11 and the ground have enabled the cutting disc and height control unit 10 to pick up loose tomatoes lying on the plastic covered planting ridge PR. This configuration also leads to a significant reduction in the pickup of dirt and debris when compared with the corresponding prior art mechanisms.

Although the best mode contemplated for carrying out the present invention has been herein shown and described, it will be apparent that modification and variation may be made without departing from what is regarded to be the subject matter of the invention.

What is claimed is:

1. In a harvester for vine crops, such as tomatoes, said harvester being of the type which severs crops from the ground having a main frame movable along a path, a pickup header frame pivotally attached at its rearward end to the main harvester frame, said header frame containing a pickup conveyor adapted to elevate severed vines from the ground to the harvester, an improved means for supporting the forward end of the header frame whereby the pickup conveyor is precisely maintained at a predetermined distance above the ground, comprising:

a single cutting disc rotatably attached to the header frame in a substantially horizontal position so that the disc contacts the ground and its leading edge precedes the foremost portion of the pickup conveyor as the harvester moves forward allowing the disc to sever the vines so that they may be elevated by the pickup conveyor, said disc providing the sole means of support for the front end of the header frame, and means for inducing continuous rotation in the single disc about its rotary axis.

2. A harvester as in claim 1, including means for mounting the disc that allows the plane of the disc to rotate about a horizontal axis perpendicular to the direction of travel of the harvester whereby the disc is able to follow the contours of the soil as the harvester moves forward.

3. A harvester as in claim 2, wherein said means for mounting the disc comprises a generally vertical shaft attached to the top of the disc at its center, a horizontal support member, means for journaling said shaft in said horizontal support member, and means for pivotally mounting said horizontal support member at each end thereof to opposite sides of the header frame.

4. A harvester as in claim 3, wherein the means for inducing rotation is a motor mounted on said horizontal support member.

5. A harvester as in claim 1, wherein the cross-section of the disc approximates a section of a sphere, whereby the disc is enabled to follow the contours of the soil.

6. A harvester as in claim 1, wherein the major portion of the disc is substantially flat, said disc including a short annular section along the periphery disposed upwardly at a relatively shallow angle whereby the flat portion of the disc contacts the ground resulting in a relatively low weight loading per unit disc area and whereby the width of the annular section and the angle it deviates from the plane of the disc determines the height above the ground at which the vines are severed.

7. A harvester as in claim 1, wherein the cutting disc is provided with a toothed periphery.

8. A harvester as in claim 1, wherein the means for inducing continuous rotation in the disc is mounted by said means for mounting the disc so as to be rotatable about said horizontal axis with said disc.

9. A harvester as in claim 3, wherein a means is provided for horizontally adjusting the pivot point of the horizontal support member whereby the relative loading on the forward and rearward portions of the disc may be varied.

10. A harvester as in claim 3, wherein a means is provided for vertically adjusting the pivot point of the horizontal support member whereby the distance between the pickup conveyor and the ground may be varied.

11. In a harvester for vine crops, such as tomatoes, said harvester being of the type which severs crops above the ground and having a main frame movable along the ground, a pickup header frame pivotally attached at its rearward end to the main harvester frame, said header frame containing a pickup conveyor adapted to elevate severed vines from the ground to the harvester, an improved means for supporting the forward end of the header frame whereby the pickup conveyor is precisely maintained at a predetermined distance above the ground, comprising:

a single cutting disc attached to the header frame in a substantially horizontal position and located so that the disc contacts the ground and the leading edge of the disc precedes the foremost portion of the pickup conveyor as the harvester moves forward, said disc providing the sole means of support for the front end of the header frame and substantially spanning the width of the pickup conveyor, said disc having means for severing tomato vines located about the periphery thereof, mounting means for rotatably attaching the disc to the header frame, said mounting means including a shaft attached to the upper side of the disc, a support beam, means for journaling the upper portion of said shaft to said support beam, and means for rotatably attaching the support beam to the header frame whereby the plane of the disc is free to rotate about a horizontal axis perpendicular to the direction of travel of the harvester in a manner that allows the disc to follow the contours of the ground, and means for inducing continuous rotation in the disc about its rotary axis.

12. A harvester as in claim 11, wherein the means for inducing rotation is a hydraulic motor mounted on the support beam.

13. A harvester as in claim 11, wherein the major portion of the disc is substantially flat and wherein the disc includes an annular section along the periphery disposed upwardly whereby the flat portion of the disc contacts the ground resulting in a relatively low weight loading per unit disc area and whereby the width of the annular section and the angle it deviates from the plane of the disc determines the height above the ground at which the vines are severed.

14. A harvester as in claim 13, wherein the cutting disc is provided with a toothed periphery.

15. A harvester as in claim 13 wherein the annular section of the cutting disc is relatively short as compared with the diameter of the disc and wherein it deviates from the plane of the disc at a relatively shallow angle.

* * * * *